United States Patent [19]

Giannone

[11] 4,185,674

[45] Jan. 29, 1980

[54] VEHICLE TIRE CHAIN STRUCTURE

[76] Inventor: Victor S. Giannone, 7 Fox Hill Rd., Peekskill, N.Y. 10566

[21] Appl. No.: 911,285

[22] Filed: May 31, 1978

[51] Int. Cl.² ............................................. B60C 27/10
[52] U.S. Cl. ..................................... 152/218; 152/233
[58] Field of Search .............................. 152/231–233, 152/217–219, 213 R, 213 A, 239–245

[56] References Cited

U.S. PATENT DOCUMENTS

| | | | |
|---|---|---|---|
| 2,528,203 | 10/1950 | Zwosta | 152/233 |
| 2,646,099 | 7/1953 | Johnson | 152/219 X |
| 2,685,321 | 8/1954 | Petrie | 152/219 |
| 2,722,961 | 11/1955 | Eden | 152/241 X |
| 3,970,132 | 7/1976 | Giannone | 152/233 |

FOREIGN PATENT DOCUMENTS

| | | | |
|---|---|---|---|
| 38810 | 8/1965 | Fed. Rep. of Germany | 152/231 |
| 478002 | 10/1969 | Switzerland | 152/233 |

*Primary Examiner*—Joseph F. Peters, Jr.
*Assistant Examiner*—D. W. Underwood
*Attorney, Agent, or Firm*—Curtis Ailes

[57] ABSTRACT

A plurality of metal cross chains are provided which are interconnected with one another by means of inboard and outboard rope connectors. Various means are provided for adjusting the size and determining the tightness of the tire chain structure when assembled on the tire, such as a plurality of removable crown loop length adjustment devices each comprising a helix of metal wire retained by a hinged retainer lever mounted upon U-loops in the rope connectors.

9 Claims, 9 Drawing Figures

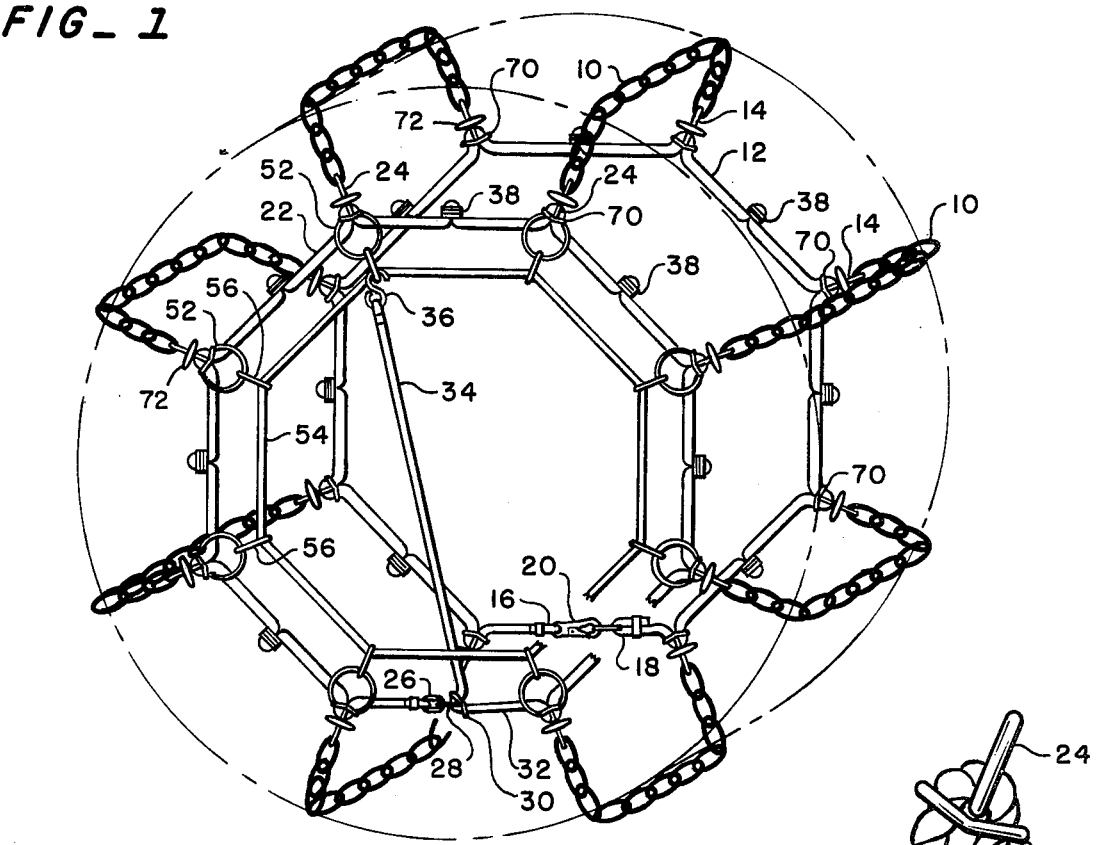
FIG_1
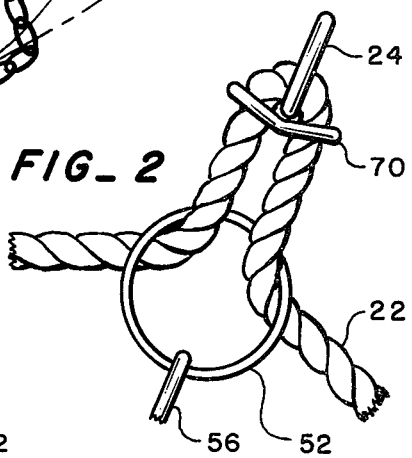
FIG_2
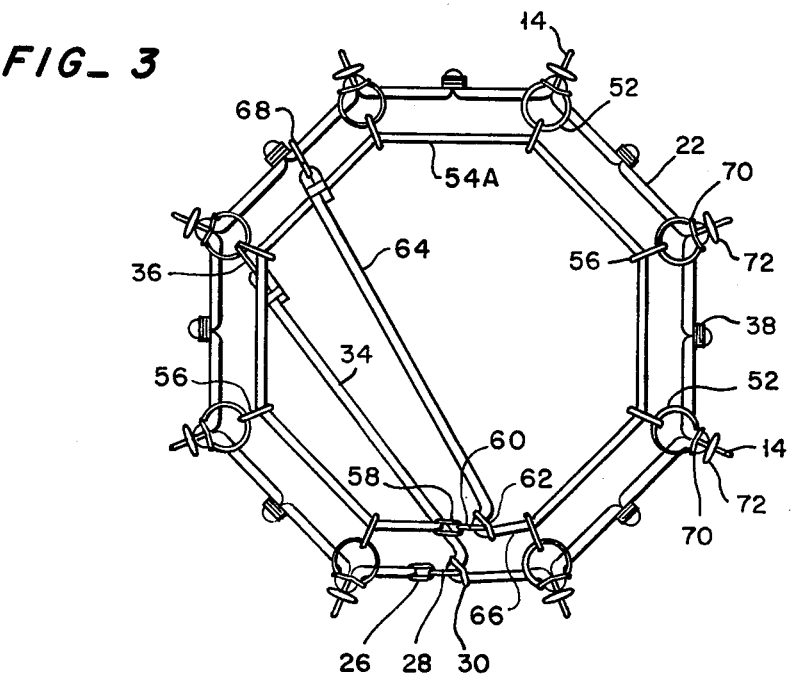
FIG_3

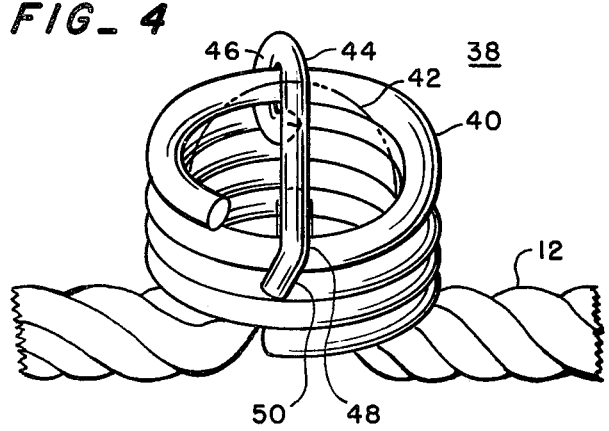
FIG_4
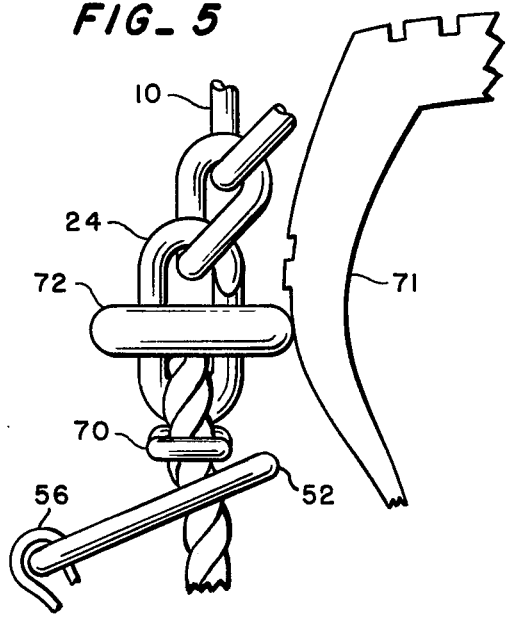
FIG_5
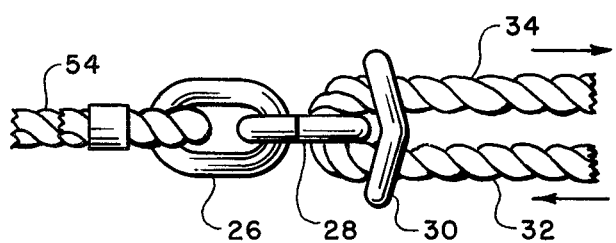
FIG_6
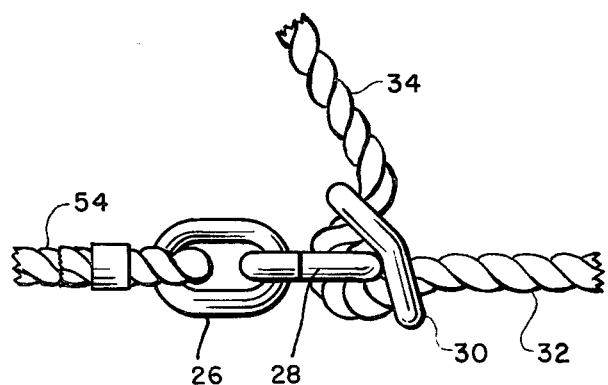
FIG_7
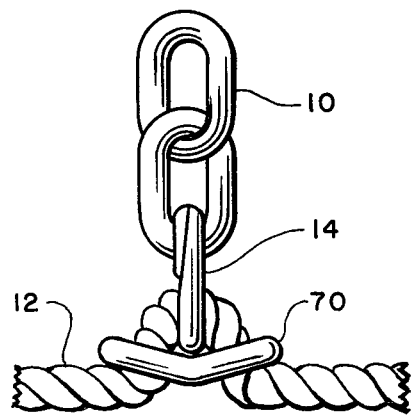
FIG_8
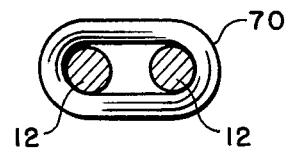
FIG_9

VEHICLE TIRE CHAIN STRUCTURE

The invention particularly relates to new and novel tire chain structures of the type having non-metallic interconnectors for the cross chains.

Conventional tire chains are heavy, difficult to mount upon the tire, and are difficult to tighten upon the tire so that they often remain loose and subject to banging against the fender of the vehicle in a most unsatisfactory and disturbing manner, subjecting the chain to breakage, subjecting the vehicle to damage, and often limiting the maximum speed of the vehicle while the chains are mounted.

Because of all of these disadvantages, various proposals have been made in the past for vehicle tire chain structures employing non-metallic connectors between the cross chains. A number of such structures have been devised by the present inventor, as shown in his prior U.S. Pat. Nos. 3,856,069, 3,858,634, and 3,970,132. The present invention represents an improvement over those prior structures.

One of the major problems in all tire chain structures, including structures employing non-metallic cross chain connectors, is to provide for ease of adjustment in the size of the tire chain structure to exactly fit a particular tire, without requiring an infinite number of different sizes to fit all of the different tire sizes. Another closely related problem is that of tightening the tire chain structure after it is assembled upon the tire.

Accordingly, it is a major object of the present invention to provide improved means for adjusting the size and tightness of vehicle tire chain structures having non-metallic connectors for the cross chains.

Another object of the present invention is to provide an improved vehicle tire chain structure employing non-metallic interconnectors for the cross chains in which the connections to the cross chains are very easily made, and wherein the points of attachment of the non-metallic connectors to the cross chains are maintained in a substantially fixed position during mounting and use of the structure.

Another object of the invention is to provide an improved vehicle tire chain structure including an improved means for protecting the side wall of the tire at the ends of the cross chains. This is believed to be particularly important with radial tires which have substantial flexing of the tire sidewalls.

Another object of the invention is to provide an improved tire chain structure in which the cross links are more easily replaced when worn or broken.

Other objects and advantages of the invention will be apparent from the following description and the accompanying drawings.

In carrying out the invention, there is provided a vehicle tire chain structure comprising a plurality of metal cross chains for positioning across the tread of the tire to enhance traction, an inboard rope connector connected to the inboard ends of said cross chains by threading through the end links of the cross chains and including releasable attachment elements at the ends of the inboard rope connector for attaching the ends to one another, an outboard rope connector connected to the outboard ends of said cross chains by threading through the end links of the cross chains, said outboard rope connector including an attachment element at one end and a second attachment element connected near the other end thereof for attachment to said first attachment element. Various means are provided for adjusting the size and tightness of the rope connectors when the tire chain structure is mounted upon the tire.

In the accompanying drawings:

FIG. 1 is a perspective view illustrating a preferred embodiment of the vehicle tire chain structure in accordance with the present invention.

FIG. 2 is a detail view showing the action of a floating ring on the outboard rope connector to tighten that rope connector on the vehicle tire.

FIG. 3 is a side view of the outboard side of a modification of the structure of FIG. 1.

FIG. 4 illustrates in detail the features of construction of a removable crown loop length adjustment device which is incorporated in the chain structure.

FIG. 5 is a front detail view illustrating additional features of the interconnection of the outboard rope connector to the cross chain.

FIGS. 6 and 7 illustrate details of the operation and construction of a slidable connection provided at the end of the outboard rope connector for adjusting the tightness of that connector.

FIG. 8 illustrates in detail the construction of a locking ring having a V-shaped side profile which forms a part of a preferred embodiment of the invention.

FIG. 9 is a plan view of the locking ring of FIG. 8.

Referring more particularly to FIG. 1, there is shown a perspective view of a preferred embodiment of a vehicle tire chain structure in accordance with the present invention which is illustrated as mounted upon a tire, the tire itself being indicated only in phantom, in order to more effectively reveal the tire chain structure. The tire chain structure is shown to include a plurality of metal cross chains 10 which are intended to be positioned across the tread of the tire to improve traction. The structure also includes an inboard rope connector 12 which is intended to be positioned on the hidden side of the tire, and which is connected to the inboard ends of each of the cross chains by being threaded through the end links 14 of each of the cross chains. At the ends 16 and 18 of the inboard rope connector, there are provided releasable attachment elements 20 to attach the ends to one another. The releasable attachment elements may be conventional in construction.

The tire chain structure also includes an outboard rope connector 22 which is similarly connected to the outboard end of the cross chains by threading through the outboard end links 24 of the cross chains.

The outboard rope connector 22 includes an attachment element 26 at one end, which may simply consist of a metal ring, and a second attachment element 28 which may be slidably connected near the other end of the outboard rope connector for attachment to the first attachment element 26. The second attachment element 28 may consist of a simple metal hook which can be hooked upon the metal ring 26, and through which the body of the rope connector may slide. A locking ring 30 is provided near the attachment hook 28, and the locking ring embraces the two sides of the outboard rope connector entering and leaving the second attachment element 28 to lock the slidable connection of the outboard rope to the attachment 28 after tightening of the rope. This is done by attaching the outer loose end of the outboard rope connector to another part of the tire chain structure to establish and maintain an obtuse angle between entering and leaving sides of the outboard rope connector beyond the locking ring 30. The entering side is shown at 32, and the leaving side is shown at 34. The leaving side 34 is sometimes referred to as a tail end, and preferably includes a hook, as indicated at 36, to easily and quickly fasten the tail end 34 at an obtuse angle. The tightening and locking action of the tail 34 is described more fully below in connection with FIGS. 6 and 7.

In order to provide a very simple and easily used means for adjusting the size and tightness of the inboard and outboard rope connectors, in accordance with the present invention, those rope connectors are preferably provided with crown loop length adjustment devices 38, which are arranged, as illustrated in FIG. 1, at points intermediate to the attachments of the rope connectors to the cross chains.

As illustrated in more detail in FIG. 4, each of the crown loop devices 38 comprises a helix 40 formed of a plurality of turns of metal wire girdling a U-loop 42 of the associated rope connector, such as 12. The helix 40 really forms an open-ended cylinder member and it is sometimes referred to as such below. A retainer lever 44, which may also be formed of wire, is hingedly attached, as indicated at 46, to the top turn of the helix 40, and has a length sufficient to span across the top of the opposite side of the helix, as indicated at 48. The lever 44 also preferably has a down-turned end 50 which extends over the edge of the helix. Lever 44 is sometimes referred to below as a retainer member. In order to promote the clarity of FIG. 4, the top of the U-loop 42 is shown in phantom. The retainer lever 44 is positioned under the end of the U-loop 42 to maintain the crown loop device upon the U-loop when the rope is under tension. If it is desired to lengthen the rope connector, the crown loop length adjustment device can be easily removed by releasing the tension on the rope connector, raising the U-loop in the helix to release the retainer lever, lifting the retainer lever out of the end of the loop, and then sliding the loop out of the helix to permit the loop to open. If the rope connector is to be later shortened again, the crown loop device can be easily reassembled to the rope connector by reversing the above steps.

Referring back again to FIG. 1, another important feature of the present invention which provides for very convenient adjustment of the size and tightness of the tire chain structure is the provision of separate floating rings 52 girdling the entering and departing sides of the outboard rope connector 22 at each connection of the rope connector 22 to the end links of the cross chains. These floating rings 52 are substantially larger in interior cross section than the combined cross sectional areas of the entering and departing sides of the rope connector 22 so as to be relatively freely slidable upon the rope connector when the rope connector is not under tension. A spreader device 54 is interconnected to all of the floating rings 52 to pull the floating rings towards the center of the wheel to cause the floating rings to tighten the inboard connector to thereby tighten the entire tire chain structure upon the tire. As illustrated in FIG. 1, the spreader 54 may comprise a closed loop of elastic rubberlike material equipped with a series of hooks 56 which are hooked upon the floating rings 52 to thereby arrange the spreader around the interior circumference of the tire chain structure. The elastic spreader 54 has an unstressed circumference substantially smaller than the assembled circumference so that the elastic spreader is under elastic tension when assembled, to thereby maintain the tightness of the inboard rope connector in the entire chain structure by pulling the floating rings radially inwardly. FIG. 2 is an enlarged detail illustrating how the radial inward movement of the ring 52 by the spreader 54 tends to shorten the rope connector 22.

The elastic spreader 54 may be composed of rubber, or of a non-rubber elastic material. As used in this specification, the term "rubber-like" is intended to include all such elastic materials including rubber itself.

FIG. 3 illustrates a side view of only the outboard part of a modified embodiment of the invention. In the modified embodiment of FIG. 3, the elastic spreader 54 is replaced by a rope spreader 54A. The rope spreader is equipped with the hooks 56 for attachment to the floating rings 52 so that the rope spreader extends around the inner circumference of the entire chain structure. The rope spreader includes an attachment 58 connected at one end, which may simply consist of a metal ring, and a second attachment element 60 slidably connected near the other end of the rope spreader for attachment to the ring 58. The spreader includes a locking ring 62 closely embracing the two sides of the spreader rope entering and leaving the attachment element 60 to lock the slidable connection after tightening of the spreader rope. This is done by attaching the outer loose end 64 of the spreader rope to another part of the tire chain structure to establish and maintain an obtuse angle between the entering and leaving sides of the spreader rope beyond the locking ring 62. The two sides are designated 64 and 66 between which the obtuse angle is to be maintained. The loose end 64 may preferably include a hook fitting 68, by means of which the attachment of the end may be accomplished to maintain the obtuse angle, and the locking of the end of the spreader rope. If there is an excess of spreader rope in the end 64, the end 64 may be threaded over the part of the spreader rope at which it is illustrated, and stretched and connected diagonally across to another section of the spreader rope. This may provide for still more tightening of the spreader rope.

Referring again to FIG. 1, in the preferred embodiment of the invention, a separate locking ring 70 girdles the entering and departing sides of each of the rope connectors at each of the connections of the inboard and outboard rope connectors to the end links of the cross chains. The locking rings 70 are generally oval in shape in plan view, and rather closely fit the two sides of the rope connectors with which they are associated. This is illustrated in the enlarged detailed plan view of FIG. 9. As indicated more clearly in the detail view of FIG. 8, the locking rings 70 preferably each have a shallow V-shape in side view. The V-shape of the locking ring 70 has been found to be especially effective in locking the position of the cross chain and link 14 with respect to the rope connector 12. As illustrated in FIG. 8 and FIG. 9, the locking ring 70 is elongated sufficiently to permit the U-bend in the rope connector 12 as it passes through the end link 14 to be opened up to in the neighborhood of a 45 degree angle. With this feature, and the V-shape of the locking ring, it is believed that the locking action of the locking ring is especially effective because a longitudinal pull on the rope connector causes the rope on the opposite side to be pinched by the combination of the engaging portion of the end link 14 and the locking ring. This action apparently is more effective with the V-shape of the locking ring than it would be with a flat locking ring.

FIG. 5 is a partial detail, taken from the front of the wheel and showing the tire 71 to which the chain structure is mounted in partial section. The detail of FIG. 5 shows the outboard side of the tire with the floating ring 52, the associated hook fastener 56, the locking ring 70, the end link 24 of the cross chain, and part of the cross chain 10. In accordance with another preferred feature of the invention, there is provided a ring 72 of rubber-like material which is assembled under tension over the outer periphery of the end link 24 of the cross chain 10 and arranged transverse to the end link to provide protection to the side wall of the tire 71 from damage by the end link. This feature is believed to be particularly valuable when the tire chain structure is employed with radial tires which have relatively thin side walls intended to flex substantially.

In accordance with another preferred feature of the invention, the end links 14 and 24, as particularly illustrated in FIGS. 5 and 8, are preferably repair links of the split type, which may be easily pried open in order to quickly replace broken or worn cross chains by simply inserting a fresh cross chain and then re-closing the repair link.

As previously mentioned above, FIGS. 6 and 7 illustrate in detail the operation of the tightening of the end of the outboard rope connector, and the use of the locking ring 30 in connection with that locking action. Typically, as illustrated in FIG. 6, after the tire chain structure is substantially completely assembled, the loose end 34 is vigorously pulled by the person who is doing the mounting, thus causing the loose end to be lengthened by shortening and tightening the end 32 around the slidable connection of the attachment element 28. After tightening, the loose end 34 is raised to an obtuse angle to the end 32, as illustrated in FIG. 7, thus causing the rope connector to be locked by the locking ring 30. As illustrated in FIGS. 6 and 7, the locking ring 30 preferably incorporates the shallow V-shape described above in connection with the locking ring 70 illustrated in detail in FIG. 8 and FIG. 9.

Various rope materials may be employed for the inboard and outboard rope connectors 12 and 22, and for the spreader rope 54A employed in the embodiment of FIG. 3. However, ropes composed of synthetic filaments are preferred for this purpose because of their resistance to abrasion and deterioration from exposure to water and road salt. For instance, ropes composed of filament material such as the various nylons are quite acceptable, and polypropylene materials have been found to be very satisfactory and are preferred.

While this invention has been shown and described in connection with particular preferred embodiments, various alterations and modifications will occur to those skilled in the art. For instance, it will be apparent that the major features of the invention can be carried out in simpler embodiments of the invention which need not incorporate all of the features disclosed in connection with the preferred embodiments. Accordingly, the following claims are intended to define the valid scope of this invention over the prior art, and to cover all changes and modifications falling within the true spirit and valid scope of this invention.

I claim:

1. A vehicle tire chain structure comprising
a plurality of metal cross chains for positioning across the tread of the tire to enhance traction,
an inboard rope connector connected to the inboard ends of said cross chains by threading through the end links of the cross chains and including releasable attachment elements at the ends of the inboard rope connector for attaching the ends to one another,
an outboard rope connector connected to the outboard ends of said cross chains by threading through the end links of the cross chains,
said outboard rope connector including an attachment element at one end and a second attachment element connected near the other end thereof for attachment to said first attachment element,
a plurality of removable crown loop length adjustment devices connected to both said inboard rope connector and said outboard rope connector at positions intermediate to the connections of said rope connectors to the ends of said cross chains,
each of said crown loop devices comprising a helix formed of a plurality of turns of metal wire girdling a U-loop of the associated rope connector and a retainer lever hingedly attached to the top turn of said helix and having a length sufficient to span across the top of the opposite side of said helix,
said retainer lever being positioned under the end of the U-loop of said rope connector girdled by said helix to maintain said crown loop device upon the U-loop when said rope connector is under tension.
said crown loop device being easily removable from said rope connector when the tension is relieved by raising the U-loop in the helix and then lifting said retainer lever out of the end of the loop and then sliding the loop out of said helix to permit the loop to open to thus lengthen the rope connector.

2. A tire chain structure as claimed in claim 1 wherein
said retainer lever comprises a length of wire, and wherein
the hinged attachment of said retainer lever to the top turn of said helix comprises a simple turn of the end of the wire lever around the top turn of said helix,
said retainer lever also including a downwardly turned tip at the end opposite to the hingedly attached end,
said downwardly turned end being positioned so as to extend over the outside of the top turn of said helix.

3. A vehicle tire chain structure comprising
a plurality of metal cross chains for positioning across the tread of the tire to enhance traction,
an inboard rope connector connected to the inboard ends of said cross chains by threading through the end links of the cross chains and including releasable attachment elements at the ends of the inboard rope connector for attaching the ends to one another, an outboard rope connector connected to the outboard ends of said cross chains by threading through the end links of the cross chains,
said outboard rope connector including an attachment element at one end and a second attachment element slidably connected near the other end thereof for attachment to said first attachment element,
a locking ring embracing the two sides of said outboard rope connector entering and leaving said second attachment element to lock the slidable connection after tightening of said outboard rope connector by attaching the outer loose end of said outboard rope connector to another part of said tire chain structure to establish and maintain an obtuse angle between the entering and leaving sides of said outboard rope connector beyond said locking ring.

4. A vehicle tire chain structure comprising a plurality of metal cross chains for positioning across the tread of the tire to enhance traction, an inboard rope connector connected to the inboard ends of said cross chains by threading through the end links of the cross chains and including releasable attachment elements at the ends of the inboard rope connector for attaching the ends to one another, an outboard rope connector connected to the outboard ends of said cross chains by threading through the end links of the cross chains, said outboard rope connector including an attachment element at one end and a second attachment element connected near the other end thereof for attachment to said first attachment element, a separate floating ring girdling the entering and departing sides of said outboard rope connector at each connection of said rope connector to said end links of said cross chains, said floating rings being substantially circular and having a substantially larger inner cross section than the combined cross sectional areas of the entering and departing sides of said rope connector so as to be relatively freely slidable upon said rope connector when said rope connector is not under tension, and a spreader device interconnected to all of said floating rings to pull said floating rings towards the center of the wheel to cause said floating rings to shorten and thus tighten said inboard connector to thereby tighten the entire tire chain structure upon the tire.

5. A tire chain structure as claimed in claim 4 wherein said spreader comprises a closed loop of elastic rubber like material equipped with a series of hooks which are hooked upon said floating rings to thereby arrange the spreader around the interior circumference of said tire chain structure, said elastic spreader having an unstressed circumference substantially smaller than the assembled circumference so that said elastic spreader is under elastic tension when assembled to thereby maintain the tightness of the inboard rope connector in the entire tire chain structure.

6. A vehicle tire chain structure as claimed in claim 4 wherein said spreader comprises a rope equipped with a plurality of hooks to be attached serially to said floating rings so that said spreader rope extends around the inner circumference of the tire chain structure, said spreader rope including an attachment element at one end and a second attachment element slidably connected near the other end thereof for attachment to said one end, a locking ring closely embracing the two sides of said spreader rope entering and leaving said second attachment element to lock the slidable connection after tightening of said spreader rope by attaching the outer loose end of said spreader rope to another part of said tire chain structure to establish and maintain an obtuse angle between the entering and leaving sides of said spreader rope beyond said locking ring.

7. A tire chain structure as claimed in claim 4 wherein there is provided a ring of rubber like material assembled under tension over the outer periphery of each of said end links of said cross chains and arranged transverse to said end links to provide protection to the side wall of the tire from damage by said end links.

8. A tire chain structure as claimed in claim 4 wherein said end links of said cross chains comprise repair links of the split link type which can be spread open for ease in replacement of worn cross chains.

9. A vehicle tire chain structure comprising a plurality of metal cross chains for positioning across the tread of the tire to enhance traction, an inboard rope connector connected to the inboard ends of said cross chains by threading through the end links of the cross chains and including releasable attachment elements at the ends of the inboard rope connector for attaching the ends to one another, an outboard rope connector connected to the outboard ends of said cross chains by threading through the end links of the cross chains, said outboard rope connector including an attachment element at one end and a second attachment element connected near the other end thereof for attachment to said first attachment element, a plurality of removable crown loop length adjustment devices connected to both said inboard rope connector and said outboard rope connector at positions intermediate to the connections of said rope connectors to the ends of said cross chains, each of said crown loop devices comprising an open ended cylinder member girdling a U-loop of the associated rope connector and a narrow retainer member spanning across the top of said cylinder member, said retainer member being positioned under the end of the U-loop of said rope connector girdled by said cylinder member to maintain said crown loop device upon the U-loop when said rope connector is under tension, said crown loop device being easily removable from said rope connector when the tension is relieved by raising the U-loop in said cylinder member and then moving said retainer member out of the end of the loop and then sliding the loop out of said cylinder member to permit the loop to open to thus lengthen the rope connector.

* * * * *